(12) United States Patent
Smit et al.

(10) Patent No.: US 12,001,207 B2
(45) Date of Patent: Jun. 4, 2024

(54) SYSTEM FOR CONTROLLING AN AUTONOMOUS DRIVING VEHICLE OR AIR VESSEL, WHICH CAN BE CONTROLLED ON THE BASIS OF STEERING AND ACCELERATION VALUES, AND AN AUTONOMOUS DRIVING VEHICLE OR AIR VESSEL PROVIDED WITH SUCH A SYSTEM

(71) Applicants: Stephan Johannes Smit, Utrecht (NL); Johannes Wilhelmus Maria Van Bentum, Utrecht (NL)

(72) Inventors: Stephan Johannes Smit, Utrecht (NL); Johannes Wilhelmus Maria Van Bentum, Utrecht (NL)

( * ) Notice: Subject to any disclaimer, the term of this patent is extended or adjusted under 35 U.S.C. 154(b) by 210 days.

(21) Appl. No.: 16/987,612

(22) Filed: Aug. 7, 2020

(65) Prior Publication Data

US 2021/0041872 A1 Feb. 11, 2021

(30) Foreign Application Priority Data

Aug. 9, 2019 (NL) ...................................... 2023628

(51) Int. Cl.
 *G05D 1/00* (2006.01)
 *B60W 30/06* (2006.01)
 (Continued)

(52) U.S. Cl.
 CPC ........... *G05D 1/0088* (2013.01); *B60W 30/06* (2013.01); *B60W 60/0015* (2020.02);
 (Continued)

(58) Field of Classification Search
 CPC ......... G05D 1/0088; G05D 2201/0213; G05D 1/0246; G05D 1/0251; G05D 1/0274;
 (Continued)

(56) References Cited

U.S. PATENT DOCUMENTS 9,151,626 B1   10/2015  Kojo
11,222,299 B1 *  1/2022  Baalke ................. G06Q 10/087
 (Continued)

OTHER PUBLICATIONS

European Patent Office Search Report in NL 2023628 dated Apr. 23, 2020.

*Primary Examiner* — Sohana Tanju Khayer
(74) *Attorney, Agent, or Firm* — Heslin Rothenberg Farley & Mesiti, P.C.

(57) ABSTRACT

System for controlling an autonomous vehicle on the basis of control values and acceleration values, having a safety-determining module configured to receive live images from a camera, to receive recorded stored images preprocessed for image recognition from an internal safety-determining module data storage, to receive navigation instruction(s) from a navigation module; to compare the live images with the stored images to determine a degree of correspondence; and to determine a safety value which indicates the extent to which the determined degree of correspondence suffices to execute the navigation instruction(s); wherein a control module is configured to receive the navigation instruction (s); to receive the live images; to receive the safety value; to compare the safety value to a predetermined value; and if the safety value is greater than the predetermined value, to convert the navigation instruction(s) and the camera images into control values and acceleration values for the autonomous vehicle.

13 Claims, 2 Drawing Sheets

(51) Int. Cl.
  *B60W 60/00* (2020.01)
  *G01C 21/34* (2006.01)
  *G01C 21/36* (2006.01)
  *G05D 1/02* (2020.01)
  *G08G 5/00* (2006.01)

(52) U.S. Cl.
  CPC ..... *G01C 21/3407* (2013.01); *G01C 21/3602* (2013.01); *G05D 1/0246* (2013.01); *G05D 1/0251* (2013.01); *G05D 1/0274* (2013.01); *G05D 1/101* (2013.01); *G08G 5/0034* (2013.01); *G08G 5/0047* (2013.01); *B60W 2420/42* (2013.01); *B60W 2520/00* (2013.01); *G05D 2201/0213* (2013.01)

(58) Field of Classification Search
  CPC .. G05D 1/101; B60W 30/06; B60W 60/0015; B60W 2420/42; B60W 2520/00; B64C 39/02; G08G 5/0034; G08G 5/0047; B64D 47/08; G01C 21/3407; G01C 21/3602; G06N 3/08
  See application file for complete search history.

(56) References Cited

U.S. PATENT DOCUMENTS

| | | | |
|---|---|---|---|
| 2015/0248131 A1* | 9/2015 | Fairfield | G05D 1/0027 701/2 |
| 2017/0090271 A1* | 3/2017 | Harris | G06Q 10/08355 |
| 2017/0227970 A1* | 8/2017 | Taguchi | G01S 19/485 |
| 2017/0270805 A1* | 9/2017 | Parker | B64C 39/024 |
| 2018/0045519 A1 | 2/2018 | Ghadiok et al. | |
| 2018/0107215 A1* | 4/2018 | Djuric | G05D 1/0088 |
| 2019/0019349 A1* | 1/2019 | Dolgov | B60W 60/0025 |
| 2019/0079514 A1* | 3/2019 | Zhu | G06V 10/761 |
| 2019/0234745 A1* | 8/2019 | Lee | B60W 30/00 |
| 2019/0236955 A1* | 8/2019 | Hu | G08G 1/096844 |
| 2019/0384303 A1* | 12/2019 | Muller | G01C 21/3407 |
| 2020/0393842 A1* | 12/2020 | Northcutt | G05D 1/0221 |
| 2021/0088342 A1* | 3/2021 | Li | H04W 4/02 |
| 2022/0144257 A1* | 5/2022 | Maeda | B60W 10/20 |

* cited by examiner

SYSTEM FOR CONTROLLING AN AUTONOMOUS DRIVING VEHICLE OR AIR VESSEL, WHICH CAN BE CONTROLLED ON THE BASIS OF STEERING AND ACCELERATION VALUES, AND AN AUTONOMOUS DRIVING VEHICLE OR AIR VESSEL PROVIDED WITH SUCH A SYSTEM

FIELD OF THE INVENTION

The present invention relates to a system for controlling a vehicle or (air)craft which is controllable on the basis of control values and acceleration values and moves autonomously and method for training such a system.

BACKGROUND OF THE INVENTION

Unmanned and, in particular, autonomously moving vehicles or (air)craft are increasingly used for baggage and parcel transport. They can (relatively) easily be used in enclosed spaces, such as distribution centres or in other logistics applications, such as at airports, where the environment is strictly controlled and/or predictable. Often, fixed routes which are not subject to unpredictable changes can be moved in such situations.

A different situation arises when autonomously moving vehicles or (air)craft are used in the outside environment, public space or on public roads. Although the actual route to be travelled on is mainly unchanged in the short or medium term in these situations as well, environmental factors and, in particular, fellow road users on public roads give rise to unpredictable situations. It is known for regularly updated and very detailed high-resolution maps to be used here and sensors for detecting fellow road users and other objects which are not shown on the map, but a satisfactory result has hitherto not been achieved therewith, in particular because the volume of data required to be able to provide maps with a sufficient level of detail is unacceptably high in practice. In addition, although obstacles can be detected by means of the sensors, a subsequent difficulty lies in determining the necessary response.

Netherlands patent NL 2019756 by the present Applicant offers a solution to the abovementioned problems. The invention described in this patent is therefore an improvement compared to the prior art, but there is room for further improvement.

In order to make the system from NL 2019756 ready for operation, training is required. In this case, control is exercised or control is taken by an operator who (optionally remotely) enters control values and acceleration values. By repeating this several times and under different circumstances, the system learns and can, at a certain point in time, be used autonomously.

However, if circumstances arise which have not occurred during the training phase, the system may not be able to perform a certain navigation instruction or may not be able to perform it well or safely. It is an object of the present invention to provide a solution to this problem.

SUMMARY OF THE INVENTION

To this end, the invention provides a system for controlling a vehicle or (air)craft which is controllable on the basis of control values and acceleration values and moves autonomously, comprising a navigation module, a control module, at least one camera, a recognition module, a safety-determining module, a communication module, a data storage for camera images, wherein the navigation module is configured to receive a destination received from a user, chosen from a closed list of destinations, to determine a position of the vehicle or (air)craft, in particular on the basis of the last known position, to determine a route from the position to the destination, to convert the route into navigation instructions, to provide the navigation instructions to the control module, to receive a recognition confirmation from the recognition module, wherein the camera is configured to capture live camera images from the vehicle or (air)craft and to provide the images to the control module, the safety-determining module, the communication module and the recognition module, wherein the data storage is configured to store the camera images annotated as a navigation point, to store navigation points as possible destinations, to store the navigation point where the vehicle or (air)craft was last and/or to store a series of navigation points as a route, and wherein the safety-determining module is configured to receive live camera images from the camera, to receive annotated stored recorded camera images in a form preprocessed for image recognition from an internal safety-determining module data storage, to receive the at least one navigation instruction from the navigation module, to compare the live camera images with the received annotated stored recorded camera images in a form preprocessed for image recognition and to determine a degree of correspondence; and to determine a safety value which indicates the extent to which the determined degree of correspondence suffices to execute the at least one navigation instruction, wherein the control module is configured:

- to receive the at least one navigation instruction from the navigation module, to receive the live camera images from the camera, to receive a safety value from the safety-determining module, to compare the safety value to a predetermined value and if the safety value is greater than the predetermined value, to convert the at least one navigation instruction and the camera images into control values and acceleration values for the controllable autonomously moving vehicle or (air)craft;
- wherein the recognition module is configured to receive live camera images, to compare the live camera images with previously stored preprocessed camera images annotated with at least characteristics of navigation points, and to determine that a navigation point has been reached if a live camera image has a predetermined degree of correspondence with a camera image annotated with a navigation point; and to supply a recognition confirmation to the navigation module if it is determined that a navigation point has been reached.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
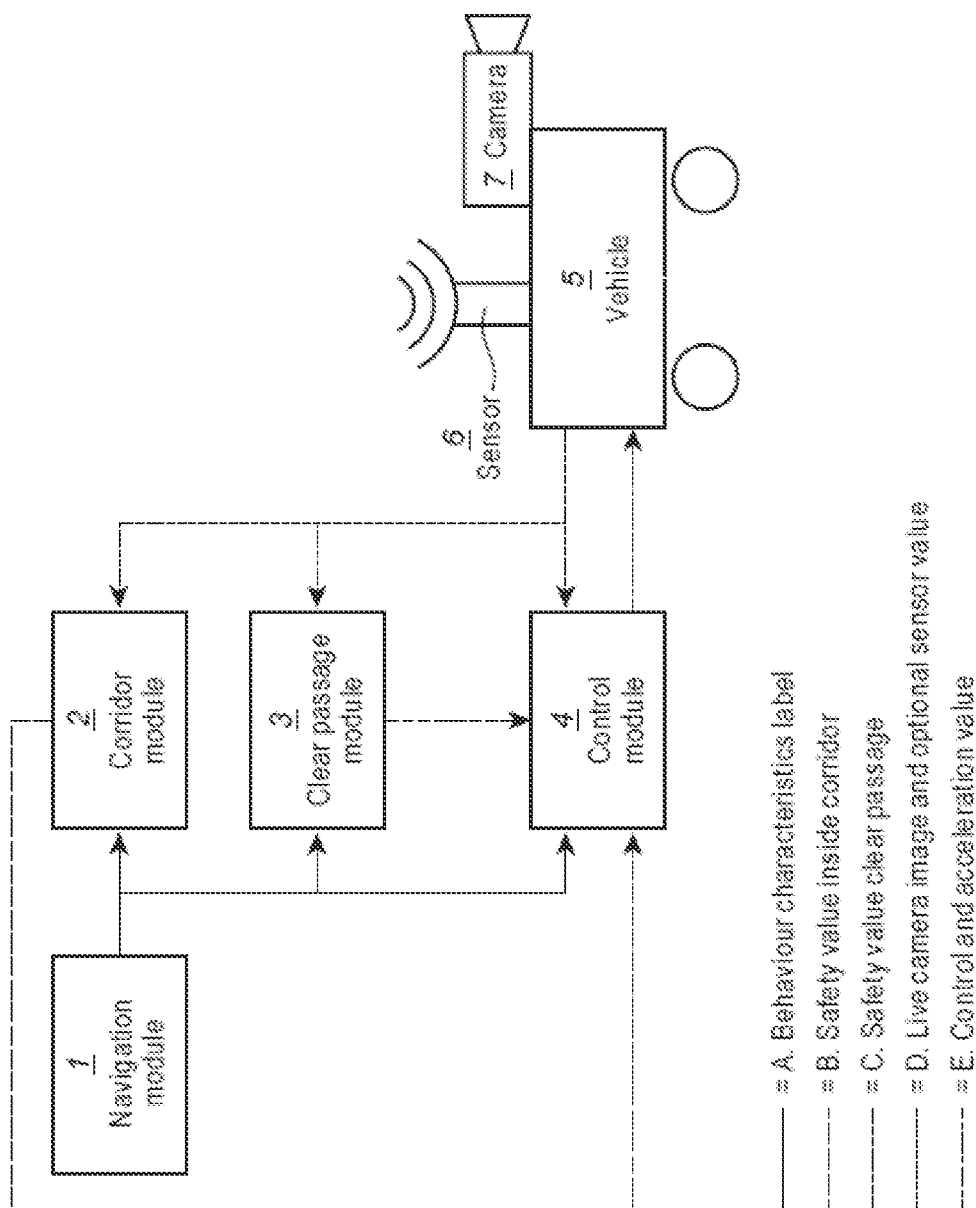
FIG. 1 provides a diagrammatic representation of a system according to the present invention.

The system according to the present invention offers the advantage that the system does not come to a stop or starts to behave in an undesirable way when it does not recognise a situation sufficiently well. The predetermined value to which the safety value is compared may be adjustable and may be chosen by an operator. The value may be a constant value or may be dependent on another value, situation or status, such as a weather conditions or the time of day or a geographic location. For example, in a built-up area or in city traffic, a greater degree of safety may be required than in a remote area.

The value may be expressed in different ways, such as a number between 0 and 1 or a percentage. The request for control values and acceleration values may be sent to an operator who can then take over control of the system remotely. In an embodiment, the system subsequently learns from the control values and acceleration values used by the operator and will then consequently in a situation with similar live camera images determine a higher safety value, as a result of which it is able to determine control values and acceleration values itself.

The system may furthermore be provided with a clear-passage-determining module, configured: to receive live camera images (12$t$) from the camera, to receive the at least one navigation instruction (7$t$) from the navigation module, to store recorded camera images from the camera in an internal store which are annotated at least with navigation instructions and a value which indicates a chance of clear passage in a form preprocessed for image recognition, to receive stored annotated camera images from the internal store, to compare the live camera images with the stored annotated preprocessed camera images and to determine on the basis of the annotated previous images whether the navigation instruction can be executed.

During the training stage, the system thus learns that receiving navigation instructions which are in theory executable in a certain location, the operator sometimes decides not to move. A reason for this may be the presence of fellow road users which have right of way. Such a situation may occur, for example, when the navigation instruction is: "turn left at the next junction" and there is an oncoming fellow road user who is going straight ahead. The system then learns that when such a fellow road user who has the right of way, the navigation instruction cannot be executed immediately. If the oncoming fellow road user is no longer present in a subsequent live camera image, the navigation instruction can be executed.

By repeatedly following the same route, the system also learns that the same oncoming fellow road user at the same location does not affect the navigation instruction "turn right at the next junction".

In a further embodiment, if it has been determined that the navigation instruction cannot be executed, the system is configured to again receive live camera images from the camera, to compare the newly received live camera images with the stored camera images and to determine again whether the navigation instruction can be executed on the basis of the control values and acceleration values from the annotations.

The navigation instructions preferably comprise at least a directional indication, such as an exact geographical directional indication (in degrees), a geographical directional designation (such as "towards the north") and/or a specific directional indication (such as turn left). On the basis thereof and of the received camera images, the control module is able to determine a steering angle with which the vehicle or (air)craft follows the intended directional indication. Depending on the possibilities which the vehicle or (air)craft therefore has, the navigation instructions may furthermore comprise additional operations, such as delivering or receiving a parcel or similar operations.

The instructions may be in the form of a list, wherein a navigation point is designated in each case with at least one direction to be followed from that point. More preferably, the navigation instructions also comprise a speed indication which indicates, for example, the maximum speed applicable from the relevant navigation point in the indicated direction.

The system can therefore be configured in such a way that the navigation instructions are processed by the control module as target values or desired values which impose a maximum speed. The nature and circumstances of the route may in this case give cause to maintain a speed which is lower than the target value.

It should be noted that, in a further preferred embodiment of the present invention, the live camera images and the previously stored camera images annotated with at least navigation points or alternatively navigation instructions are compared after preprocessing, wherein recognition points determined in the live camera images, rather than the complete camera images, are compared with recognition points determined in the previously stored camera images. These recognition points are applied by algorithms used in the preprocessing and may, for example, be (combinations of) horizontal and vertical lines, or other characteristics preferably independent from the weather conditions and the time of day.

More preferably, the navigation module is configured to supply a subsequent navigation instruction to the control module as soon as the recognition module has reported that a navigation point has been reached. In this way, the control module does not have to store a complete route, but always has to in each case formulate control values and acceleration values to one navigation point.

In a further embodiment, the control module is configured to determine a way to convert the navigation instructions into directional values and acceleration values for controllable autonomous driving on the basis of deep learning. Here, a route to be driven or an area to be driven is driven at least once, but preferably several times, wherein camera images are recorded which are processed by the control module. The module thereby recognizes patterns in the images, for example distances to kerbs, white lines on the road, traffic signs, turn-offs and the directional values and acceleration values given by the user thereto. After having been trained in this way, the system can itself generate direction values and acceleration values on the basis of video images. Analogously, this also applies to the safety-determining module and the clear passage-determining module. The output then consists of a safety value and a clear passage-indication.

A user who is training the control module can thereby mark the navigation points. By making different choices at certain navigation points, such as crossings (such as turn left the first time and turn right the second time), the system learns that there are various possibilities at such a location and also learns the direction values and acceleration values which are associated with the various choices. By also recording the relevant choice (for example "turn left" of "turn right"), the system can then perform an entered navigation instruction which corresponds to such a choice.

The deep learning-technique is known per se and existing technologies may be used for the implementation thereof. A tried and tested system which appears to be suitable for the present invention is commercially available as Nvidia Dave 2 network topology.

Such systems offer a technology which make it possible for a vehicle or (air)craft to have certain learnt driving behaviour, wherein the vehicles or (air)craft remain independently on the road. By using navigation points and (visually) recognizing them, the present invention adds a navigation facility. The system thus uses technology existing per se to follow a route, but, as it recognizes the options, in particular at navigation points, it can follow the instructions having a level of abstraction of "turn left at the second turn-off", on the basis of camera images and without the location or the option having to be clear beforehand.

The navigation instructions always apply from one navigation point to another navigation point and are therefore generated and forwarded at a relatively low frequency, depending on the distance between the navigation points. In order to be able to react appropriately to quickly changing traffic conditions, the control module is preferably configured to provide control values and/or acceleration values at a frequency of at least 2, and preferably at least 10 Hz, applied at a speed of a few kilometres per hour. This frequency may be chosen to be higher in the case of a higher speed of the vehicle or (air)craft. Analogously, this also applies to the safety-determining module and the clear passage-determining module.

The system according to the present invention may optionally be designed to have a GPS system or other sensors for recognizing error situations. In this way, it is possible, for example, to determine whether the vehicle or (air)craft has a greater deviation than is to be expected from a navigation point to which it is en route, and to conclude that an error has occurred. The system may be configured to issue an error message at such a time and send it, for example, to a central monitoring facility, such as a traffic management centre or a monitoring room.

The system may furthermore be adapted to various traffic situations or circumstances by being trained in all these situations and by recording associated adaptations in driving behaviour. In this way, it is possible, for example, to configure the system to reduce speed on the basis of obstacles, weather conditions, illumination or quality of the road surface. The training may be established on the basis of images and other data in the real world, but also through interaction with virtual worlds in simulation.

The invention furthermore relates to a method for training a system according to one of the preceding claims, comprising the following steps: A. Moving the controllable autonomously moving vehicle or (air)craft over at least one intended autonomously drivable route by a driver, B. Recording camera images of the route while moving, C. Storing navigation points in relation to the camera images, and D. Annotating the navigation points with coordinates for the navigation module. It is also conceivable for a system to be trained in moving along routes entirely in simulation. The simulations are partly fed by images recorded in the real world. These may be images of other routes. This applies analogously to shipping routes and flight routes.

In order to be able to train the system, the vehicle or (air)craft must be controllable and must be controlled by a driver who moves along at least one intended autonomously drivable route, or moves in an area in which a plurality of routes are located. It may be that in this case the driver is present in or on or near the vehicle or (air)craft, but it is preferable to configure the system in such a way that it is remotely operable and therefore also remotely trainable. During the driving, the driver himself always provides control values and acceleration values which are linked by the system to camera images of the route recorded during the driving. In this way, the system learns which control values and acceleration values belong to which street or road layout and can generate the associated direction values and acceleration values following the training on the basis of live images. By repeatedly revisiting the navigation points for which a plurality of possibilities exist (for example turn-offs) in training and thereby making different choices.

According to a preferred embodiment of the method according to the present invention, the camera images are recorded in a form preprocessed for image recognition. In this way, the characteristics from the image which are relevant for image recognition and/or location recognition are stored instead of the entire image stream. Combinations of horizontal and vertical lines in the image, large areas or characteristic shapes may be envisaged here.

In order to eliminate the dependence on changing conditions, such as the time of day, the weather and/or the traffic density, the method according to the invention preferably comprises the repetition of step A. under different weather conditions and/or traffic conditions. In this case, the system learns to recognize the weather conditions and traffic conditions, and also the manner in which to react thereto. The camera images recorded during the training may then be processed off-line, wherein, for example, they are preprocessed for image recognition, and/or a timestamp, steering angle and/or acceleration value is/are linked to the images.

In a more advanced system according to the invention, the system is configured to train one system on the basis of the camera images recorded by one or more similar systems. In this way, a self-learning system is created and each vehicle or (air)craft does not have to be trained independently.

The invention will now be explained with reference to FIG. 1 and FIG. 2, which provide diagrammatic representations of a system according to the present invention.

Figure 2:
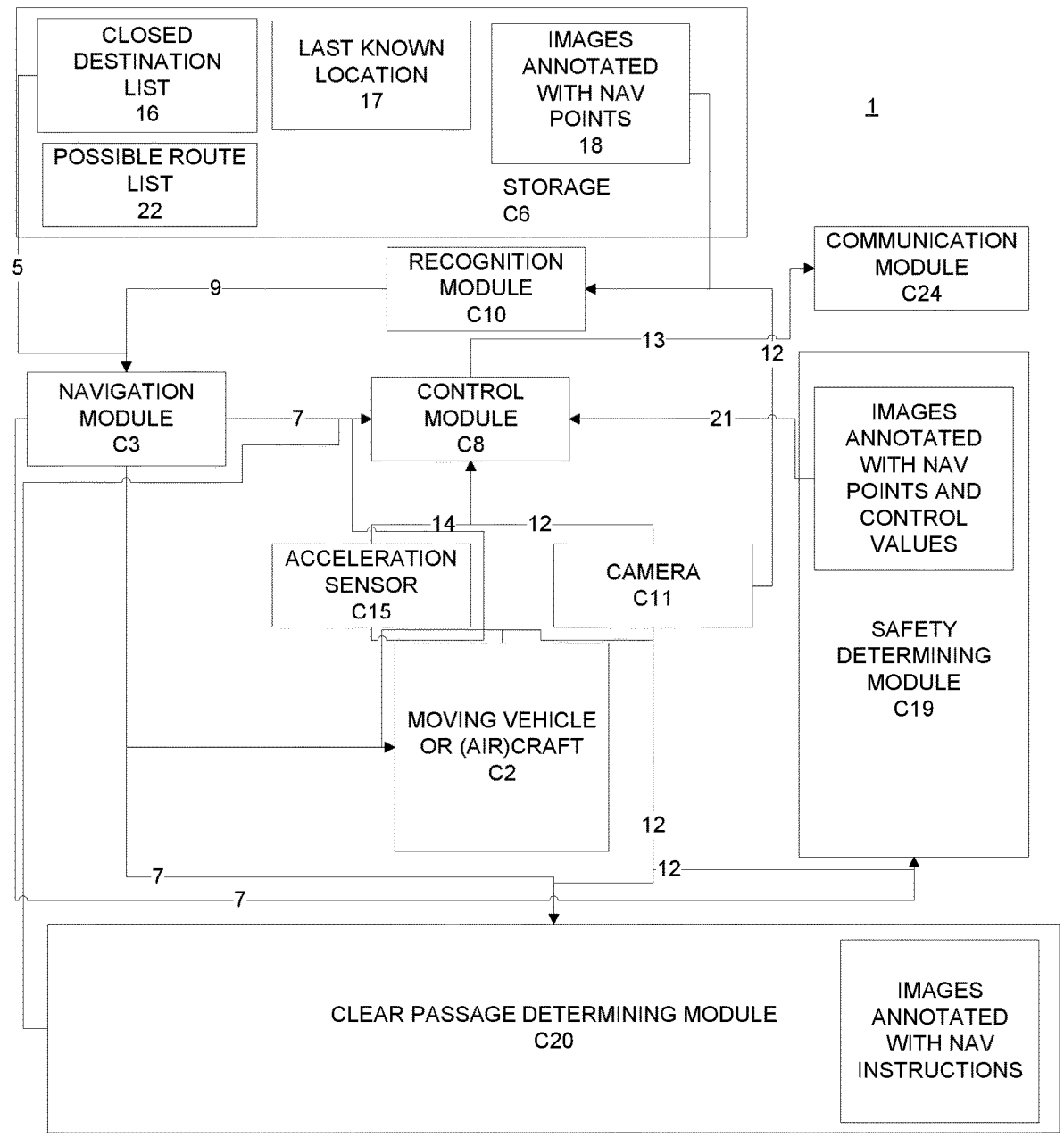
FIG. 2 provides a diagrammatic representation of a system according to the present invention.

FIG. 2 shows a system 1 for controlling an autonomously moving vehicle or (air)craft C2 which is controllable on the basis of control values and acceleration values 13*b*, comprising a navigation module C3 which is configured to receive a destination 5*c*, chosen from a closed list of destinations 16*y* stored in a data storage device C6, from a user, and to determine a position of the vehicle or (air)craft, for example by recording the last-known location 17*c* in the data storage device C6, to determine a route from the position to the destination, which route may similarly be chosen from a list 22*c* of possible routes which are also stored in the data storage device C6, to convert the route into navigation instructions, to supply the navigation instructions 7*h* to a control module C8, and to receive a recognition confirmation 9*c* from a recognition module C10.

The system furthermore comprises a camera C11 which is configured to capture live camera images 12 from the vehicle or (air)craft C2 and to supply the images 12*h*, 12*j* to the control module C8 and the recognition module C10. The control module C8 is furthermore configured to receive at least one navigation instruction 7*h* from the navigation module C3 and to receive the live camera images 12*h* from the camera C11 and to convert the at least one navigation instruction 7*h* and the camera images 12*h* into control values and acceleration values 13*b* for the controllable autonomously moving vehicle or (air)craft C2.

In the embodiment shown, the control module C8 also makes use of an acceleration signal 14*h* obtained from an acceleration sensor C15. Finally, the recognition module C10 is configured to compare the live camera images 12*j* with previously stored camera images annotated with at least characteristics 18*j* of navigation points, and to determine that a navigation point has been reached if a live camera image 12*j* has a predetermined degree of correspondence with a camera image 18*j* annotated with a navigation point, and to supply a recognition confirmation 9*c* to the navigation module C3 if it is determined that a navigation point has been reached.

The figure also shows a safety-determining module C19, wherein the safety-determining module C19 is configured to receive live camera images 12*s* from the camera C11, to store recorded camera images annotated at least with navigation instructions and control values in a form preprocessed for image recognition in an internal safety-determining module data storage (c19*a*), to receive the at least one navigation instruction 7*s* from the navigation module C3, to compare the live camera images 12*s* with the stored camera images and to determine a degree of correspondence; and to determine a safety value 21*h* which indicates the extent to which the determined degree of correspondence suffices to execute the at least one navigation instruction 7*h*. This value is sent to the control module C8 which is configured to compare the safety value 21*h* to a predetermined value and if the safety value is greater than the predetermined value, to convert the navigation instruction 7*h* and the live camera images 12*h* into control values and acceleration values G13*b* for the controllable autonomously moving vehicle or (air) craft C2. If the safety value is smaller than the predetermined value, the control module can send a request for 13*y* control values and acceleration values via communication module C24. This communication module may be a separate module or may be part of the control module C8.

The system also comprises a clear-passage-determining module C20 configured to receive live camera images 12*t* from the camera C11, to receive navigation instructions 7*t* from the navigation module C3, to store recorded camera images annotated at least with navigation instructions in a form preprocessed for image recognition from the internal store C20*a*, to compare the live camera images with the stored camera images and determine from the annotations if the navigation instruction can be executed.

In addition to the example mentioned above, many embodiments fall within the scope of protection of the present application, as defined in the following claims.

The invention claimed is:

1. A system for controlling a vehicle, wherein the vehicle comprises a land-based vehicle or an aircraft, the vehicle which is configured to be controlled to move autonomously based on control values and acceleration values, the system comprising:
   a navigation module;
   a control module;
   at least one camera;
   a recognition module;
   a safety-determining module;
   a communication module;
   a data storage for camera images, wherein the navigation module, the control module, the at least one camera, the recognition module, the safety-determining module, the communication module, and the data storage are communicatively coupled, the system configured to execute a method comprising:
      obtaining, by the navigation module, a destination for the vehicle, wherein the destination is selected from a finite list of destinations;
      determining, by the navigation module, a current location of the vehicle based on obtaining a last known location of the vehicle;
      generating, by the navigation module, a route from the current location of the vehicle to the destination, wherein the route comprises one or more navigational points;
      converting, by the navigation module, the route into one or more navigational instructions, wherein each navigational instruction of the navigational instructions comprises a terminating navigational point selected from the navigational points;
      continuously obtaining, by the at least one camera, images, wherein the at least one camera captures images from the vehicle;
      transmitting, by the at least one camera, the images to the navigation module, the control module, the recognition module, and the safety-determining module;
      storing, by the safety-determining module, the images in the data storage, wherein the storing comprises pre-processing the images for image recognition;
      based on the storing, annotating, by the safety-determining module, each stored image of the stored images in the data storage with an annotation representing the navigation point of the navigational points representing a physical position of the vehicle when each image was obtained;
      obtaining, by the control module, a control value and an acceleration value for at least one navigational instruction of the navigational instructions, wherein the control value and the acceleration value comprise movement instructions to control the vehicle to execute the at least one navigational instruction, the obtaining comprising:
         obtaining, by the safety-determining module, a live image from the camera;
         comparing, by the safety-determining module, the live image to a portion of the stored images;
         based on the comparing, by the safety-determining module, determining by the control module, a degree of correspondence between the live image and the portion of the stored images;
         based on the degree of correspondence, generating, by the safety-determining module, a safety value;
         comparing, by the control module, the safety value to a predetermined value;
         based on determining that the safety value is greater than the predetermined value, obtaining the control value and the acceleration value, the obtaining comprising:
            converting, by the control module, the at least one navigational instruction to the control value and the acceleration value; and
         based on determining that the safety value is less than or equal to the predetermined value, requesting, by the control module, the control value and the acceleration value and obtaining the control value and the acceleration value responsive to the requesting;
      updating, by the control module, at least one stored image of the stored images in the data storage with the acceleration value;
      determining, by the control module, whether to execute the at least one navigational instruction, the determining comprising:
         controlling, by the control module, the vehicle to execute the at least one navigational instruction, wherein the executing is based on the control value and the acceleration value;

obtaining, by the recognition module, a current image from the camera after the controlling;

confirming, by the recognition module, the executing of the at least one navigational instruction based on analyzing the current image to determine that the vehicle has reached the terminating navigational point of the at least one navigational instruction; and transmitting, by the recognition module, the confirming to the navigation module.

2. The system according to claim 1, wherein based on determining that the safety value is less than or equal to the predetermined value, stopping or parking, by the control module, the vehicle while waiting for the control value or the acceleration value.

3. The system according to claim 1, wherein the requesting is via the communication module.

4. The system according to claim 1, wherein comparing the live image to the portion of the stored images comprises:

determining recognition points in the live image and in the stored images; and comparing the recognition points in the live image with recognition points determined in the stored images.

5. The system according to claim 1, wherein the control value comprises a directional value, the converting further comprising:

accessing, by the control module, a Nvidia Dave 2 network topology; and utilizing, by the control module, the for the Nvidia Dave 2 network topology to perform deep learning to covert the at least one navigational instruction into the directional value and the acceleration value.

6. The system according to claim 1, wherein controlling the vehicle further comprises:

providing, by the control module, the control value at a frequency of at least 2 Hz, and the acceleration value at a frequency of at least 10 Hz.

7. The system according to claim 1, further comprising a clear-passage-determining module communicatively coupled to the at least one camera and the navigational module, the method further comprising:

annotating, by the clear-passage-determining module, each stored image of the stored images in the data storage with a value which indicates a chance of clear passage.

8. A system according to claim 7, wherein the determining whether to execute the at least one navigational instruction, further comprises, prior to the controlling the vehicle to execute the at least one navigational instruction:

determining, by the clear-passage-determining module, if the at least one navigation instruction can be executed, the determining comprising:

receiving, by the clear-passage-determining module, the stored images and annotations, wherein the annotations for each image comprise the value which indicates the chance of clear passage from the data storage;

comparing, by the clear-passage-determining module, the live image with the stored images; and determining, by the clear-passage-determining module, based on the at least one navigation instruction and the annotations, if the navigation instruction can be executed.

9. The system according to claim 8, the method further comprising:

based on determining that the navigation instruction cannot be executed, obtaining, by the clear-passage-determining module, a new live image from the at least one camera;

comparing, by the clear-passage-determining module, the new live image with the stored images; and determining, by the clear-passage-determining module, whether the navigation instruction can be executed based on the at least one navigation instructions and the annotations.

10. The system according to claim 7, wherein determining if the navigation instruction can be executed comprises determining, based on the at least one navigation instructions and the annotations, a clear-passage-safety value which indicates a degree of certainty that the at least one navigation instruction can be executed.

11. The system according to claim 8, wherein determining, by the clear-passage-determining module, if the navigation instruction can be executed comprises determining, by the clear-passage-determining module, based on the at least one navigation instruction and the annotations, a clear-passage-safety value which indicates a degree of certainty that the at least one navigation instruction can be executed.

12. The system according to claim 9, wherein determining, by the clear-passage-determining module, if the navigation instruction can be executed comprises determining, by the clear-passage-determining module, based on the at least one navigation instruction and the annotations, a clear-passage-safety value which indicates a degree of certainty that the at least one navigation instruction can be executed.

13. A computer-implemented method to control a vehicle, wherein the vehicle comprises a land-based vehicle or an aircraft, the method comprising:

obtaining, by one or more processors, a destination for the vehicle, wherein the destination is selected from a finite list of destinations;

determining, by the one or more processors, a current location of the vehicle based on obtaining a last known location of the vehicle;

generating, by the one or more processors, a route from the current location of the vehicle to the destination, wherein the route comprises one or more navigational points;

converting, by the one or more processors, the route into one or more navigational instructions, wherein each navigational instruction of the navigational instructions comprises a terminating navigational point selected from the navigational points;

continuously obtaining, by the one or more processors, images from a camera, wherein the at least one camera captures images from the vehicle;

storing, by the one or more processors, the images in a data storage;

based on the storing, annotating, by the one or more processors, each stored image of the stored images in the data storage with an annotation representing the navigation point of the navigational points representing a physical position of the vehicle when each image was obtained;

obtaining, by the one or more processors, a control value and an acceleration value for at least one navigational instruction of the navigational instructions, wherein the control value and the acceleration value comprise movement instructions to control the vehicle to execute the at least one navigational instruction, the obtaining comprising:

obtaining, by the one or more processors, a live image from the camera;

comparing, by the one or more processors, the live image to a portion of the stored images;

based on the comparing, determining, by the one or more processors, a degree of correspondence between the live image and the portion;

based on the degree of correspondence, generating, by the one or more processors, a safety value;

comparing, by the one or more processors, the safety value to a predetermined value;

based on determining that the safety value is greater than the predetermined value, obtaining the control value and the acceleration value based on converting the at least one navigational instruction to the control value and the acceleration value; and based on determining that the safety value is less than or equal to the predetermined value, requesting, by the one or more processors, the control value and the acceleration value and obtaining the control value and the acceleration value responsive to the requesting;

updating, by the one or more processors, at least one stored image of the stored images in the data storage with the acceleration value;

controlling, by the one or more processors, the vehicle to execute the at least one navigational instruction, wherein the executing is based on the control value and the acceleration value;

obtaining, by the one or more processors, a current image from the camera after the controlling; and confirming, by the one or more processors, the executing of the at least one navigational instruction based on analyzing the current image to determine that the vehicle has reached the terminating navigational point of the at least one navigational instruction.

\* \* \* \* \*